Nov. 1, 1927.

B. S. HOWELL ET AL 1,647,700

CULTIVATOR

Filed April 16, 1924

B. S. Howell
G. M. Fast
Inventor

By C. A. Snow & Co.
Attorneys.

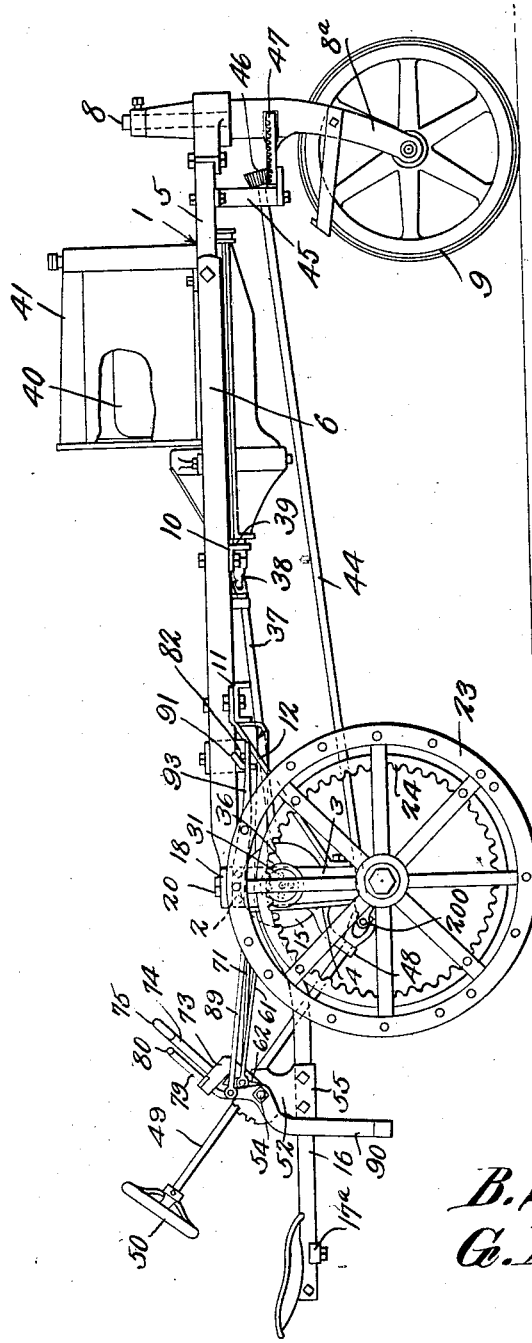

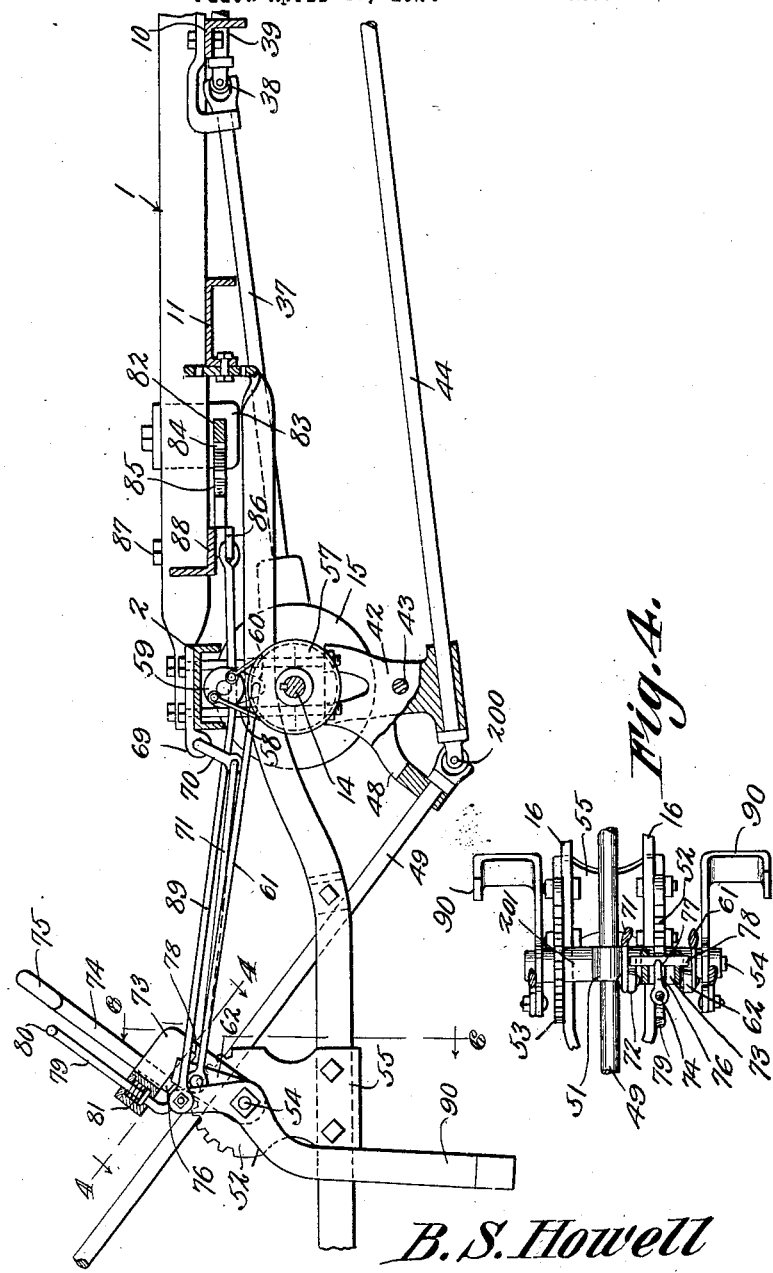

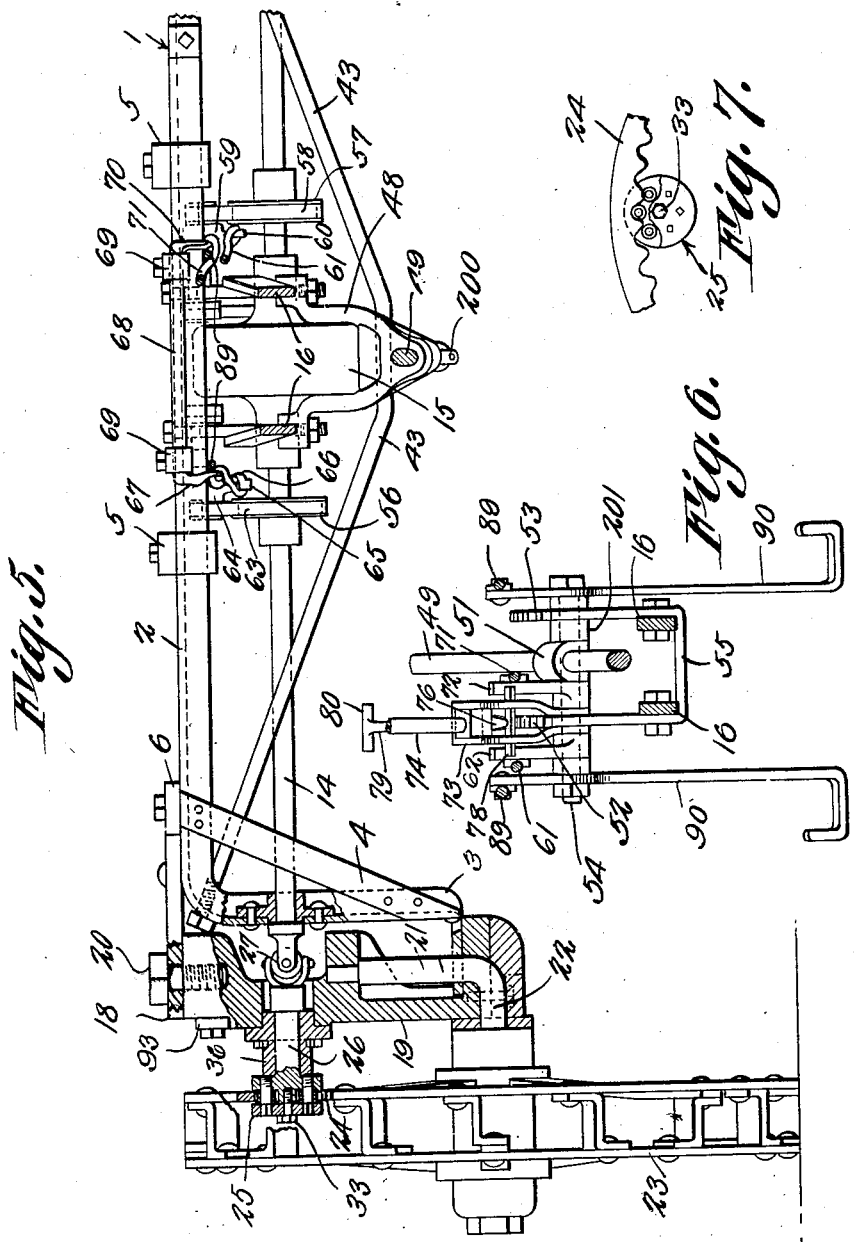

Patented Nov. 1, 1927.

1,647,700

UNITED STATES PATENT OFFICE.

BURR S. HOWELL AND GEORGE M. FAST, OF HAVILAND, OHIO.

CULTIVATOR.

Application filed April 16, 1924. Serial No. 706,942.

This invention aims to provide a novel motor vehicle construction, of peculiar utility when used with a cultivator, and, generally, to improve and to enhance the utility of devices of that type to which the invention appertains.

In the accompanying drawings:—

Figure 2 is a side elevation;

Figure 3 is a fragmental longitudinal section;

Figure 4 is a section on the line 4—4 of Figure 3;

Figure 5 is a rear elevation wherein parts are broken away;

Figure 6 is a section on the line 6—6 of Figure 3;

Figure 7 is a detail view showing one of the pinion mechanisms.

Figure 1:
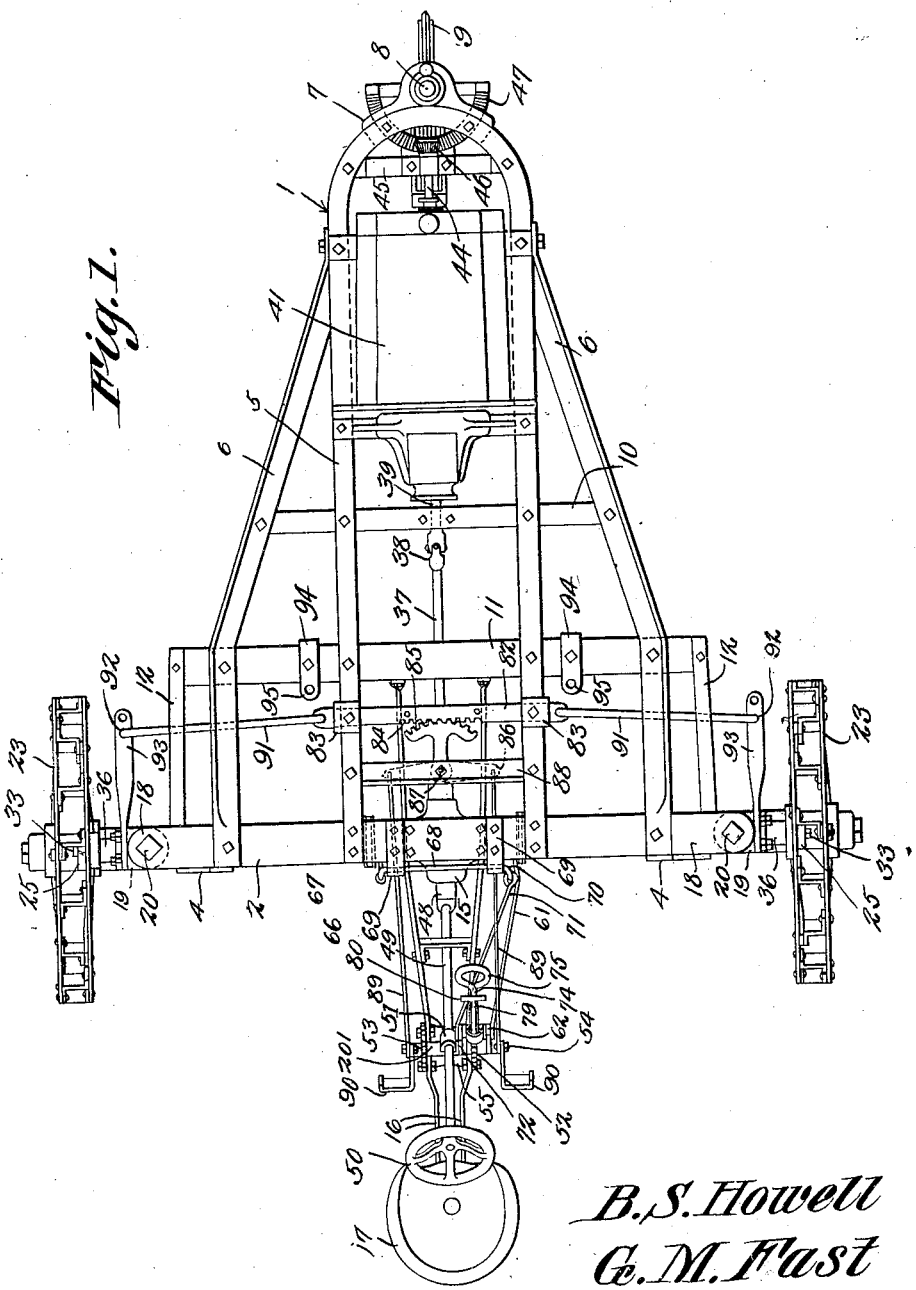
Figure 1 shows in top plan, a device constructed in accordance with the invention.

The device forming the subject matter of this application comprises a wheel-mounted vehicle 1 including an arched axle 2 having depending ends 3, braces 4 (Figure 5) extending between the ends 3 of the axle and the crown of the axle. A loop-shaped frame 5 is attached at its rear end to the axle 2, braces 6 extending between the forward portion of the frame 5 and the axle 2. There is a bearing 7 on the forward end of the frame 5, wherein a vertical shaft 8 is journaled, the shaft being provided with a fork 8ª wherein a forward ground-wheel 9 is supported for rotation. The side portions of the loop-shaped frame 5 are connected by a forward cross bar 10, an intermediate cross bar 11 and a rear cross bar 88. The braces 6 are connected to the cross bars 10 and 11, and braces 12, extend between the intermediate cross bar 11 and the depending ends 3 of the axle 2.

A transverse driven shaft 14 is journaled on the ends 3 of the axle 2, and in the shaft 14 is interposed a differential mechanism 15 which is secured to the axle 2. A rearwardly extended seat support 16 is attached at its forward end to the intermediate cross bar 11 and is carried at its intermediate portion on the casing of the differential mechanism 15, a seat 17 being mounted adjustably, as indicated at 17ª, on the support 16, for movement along the support.

The upper portion of the axle 2 carries laterally outstanding brackets 18. Supports 19 are pivoted at 20 to the brackets 18 and are connected by pivot members 21 with the lower portions of the depending ends 3 of the axle 2, the pivot members 21 having laterally outstanding axles 22 whereon traction wheels 23 are journaled. Each traction wheel 23 has an internal gear 24, pinions 25 meshing with the gears 24, the pinions being secured at 33 to short shafts 26 journaled in bearings 36 mounted on the supports 19, universal joints 27 connecting the inner ends of the shafts 26 with the outer ends of the shaft 14, the universal joints 27 being alined vertically with the pivot elements 20 and 21, and the construction being such that although the traction wheels 23 may be swung about vertical axes represented by the parts 20 and 21, the driving connection between the shaft 14 and the shafts 26 will be maintained, rotation being imparted to the traction wheels 23 by way of the pinions 25 and the internal gears 24 on the traction wheels.

A drive shaft 37 is operatively connected with the differential mechanism 15 and is united by a universal joint 38 with the shaft 39 of an internal combustion engine 40, enclosed within a hood 41 and mounted on the loop-shaped frame 5 of the vehicle 1.

The differential mechanism 15 carries a depending hanger 42, a truss rod 43 extending through the hanger, and being connected at its ends with the axle 2. A shaft 44 is journaled in the hanger 42 and in a bearing 45 which is mounted on the frame 5 at a point adjacent to the forward end of the frame. A beveled pinion 46 is secured to the forward end of the shaft 44 and meshes with a segmental gear 47 attached to the lower portion of the shaft 8 which carries the forward ground-wheel 9. The hanger 42 has a rearwardly extended arm 48 wherein is journaled an upwardly and rearwardly inclined shaft 49, provided at its rear end with a hand wheel 50, a universal joint 200 connecting the shafts 49 and 44. The shaft 49 is journaled, further, in a bearing 51 on a spacing sleeve 201 located between segments 52 and 53, a securing element 54 passing through the sleeve 201 and through the segments 52 and 53, the segments being part of a U-shaped bracket 55 secured to the seat support 16.

At this point, the description of the construction of the machine will be interrupted, to point out how certain mechanisms, already described, operate and function.

When the internal combustion engine 40 is in operation, the shaft 39 thereof will rotate the drive shaft 37, motion being transmitted through the driven shaft 14, and to the shafts 26, the pinions 25 coacting with the internal gears 24 on the traction wheels 23 to impart rotation to the traction wheels.

The ground-wheel 9 is turned laterally, to aid in steering the vehicle, through a train of parts including the hand wheel 50, the shaft 49, the universal joint 200, the shaft 44, the beveled pinion 46, and the segmental gear 47 on the shaft 8 which carries the ground-wheel 9. Noting that the supports 19, whereon the traction wheels 23 are journaled, are adapted to swing on vertical axis represented by the parts 21 and 20, it will be obvious that the traction wheels also play a part in the steering operation, but the operation of the wheels 23, so far as the steering function is concerned, may profitably be passed over until sundry other parts of the machine are described.

The device includes a brake mechanism which will now be described.

Brake drums 56 and 57 are secured to the shaft 14, on opposite sides of the differential mechanism 15. A strap 58 is disposed about the brake drum 57 and is connected at its ends to a disk 59, located beneath the axle 2 and mounted thereon for rocking movement. The disk 59 has an arm 60, united by a connection 61 with an arm 62 which is mounted to swing on the securing element 54. A strap 63 cooperates with the brake drum 56 and is connected with a disk 64 journaled on and beneath the axle 2, the disk having an arm 65, a connection 66 extending between the arm 65 and a crank 67 formed on one end of a shaft 68 journaled in bearings 69 on the axle 2, that end of the shaft 68 which is adjacent to the right hand side of the machine when the same is viewed from the rear is provided with a crank 70, a connection 71 extending from the crank 70 to an arm 72 mounted to swing on the securing element 54. A yoke 73 straddles the segment 52 and is mounted to swing on the securing element 54. An upstanding shaft 74 is mounted to rock in the yoke 73, and is equipped at its upper end with a handle 75. On the lower end of the shaft 74 there is a forwardly extended arm 76, the forward end of the arm 76 being engaged in a seat 77 fashioned in a movable member or bar 78 mounted to slide in the direction of its length in the yoke 73. A latch 79 is slidable in the yoke 73 in a direction parallel to the shaft 74 and is provided at its upper end with a grip 80, the latch being constrained by a spring 81 to cooperate with the segment 52, the spring being housed within the yoke 73. At this point, it may be remarked that the segment 53 may be omitted, if desired, the said segment merely making the bracket 55 capable of end for end reversal, to facilitate repair.

Taking up the operation of the brake mechanism, the latch 79 may be disengaged from the segment 53, and rotation may be imparted to the shaft 74 by way of the handle 75. When the shaft 74 is rotated, the arm 76 on the lower end of the shaft moves the bar 78 endwise in the yoke 73, it being possible to locate the member 78 in such a position that it will cooperate with both of the arms 72 and 62, or with one of them, at the will of an operator. Owing to this construction, both of the brake bands 63 and 58 may be applied to the corresponding drums 56 and 57, or either brake band may be applied, to the exclusion of the other, at the will of an operator. Assuming, however, that the movable member or bar 78 is in the position shown in Figure 4, the yoke 73 may be swung backwardly on the securing element 54, by means of the shaft 74 and its handle 75, the member 78 engaging both of the arms 62 and 72 and swinging them rearwardly, the connections 71 and 61 being carried rearwardly. The connection 71, coacting with the crank 70 on the shaft 68, rocks the shaft, and, by way of the crank 67 on the shaft, the connection 66, the arm 65 and the disk 64, the brake strap 63 is applied to the brake drum 56. The connection 61, cooperating with the arm 60 on the disk 59, operates the said disk and applies the strap 58 to the brake drum 57.

Referring to the means whereby the traction wheels 23 may be swung laterally at the will of an operator, Figures 1 and 3 will show that a slide 82 is disposed transversely of the machine, the slide being mounted to move in the direction of its length in bearings 83 which are carried by the side portions of the loop-shaped frame. The slide 82 has a rearwardly-facing rack 84 meshing with a segmental gear 85 carried by a cross head 86 mounted intermediate its ends to swing on a pivot member 87 carried by the rear transverse bar 88 which is mounted on the frame 5. Links 89 are pivoted at their forward ends to the cross head 86, and are pivoted at their rear ends, as shown in Figure 2, to the upper ends of depending pedal levers 90 which are mounted intermediate their ends upon the securing element 54. The inner ends of links 91 are detachably mounted in the ends of the slide 82 and are detchably and adjustably connected at their outer ends, as at 92, with projections 93 secured to and extended forwardly from the supports 19 which carry the traction wheels 23.

An operator, occupying the seat 17, may swing the pedal levers 90, the links 89 swinging the cross head 86 on its pivotal mounting 87, the segmental gear 85 imparting longitudinal movement to the slide 82 by way of the rack 84, the links 91 and the projections 93 rocking the supports 19 on their vertical axes 20—21, and a lateral inclination being given to the traction wheels 23, to aid in steering the implement and to enable the same to make a short turn, it being noted again at this point that the drive to the wheels 23 continues, since the shafts 26 are connected to the shaft 14 by the universal joints 27. The links 91 may be cast off at their inner ends from the ends of the slide 82, and the inner ends of the links may be engaged in the openings 95 of keepers 94 which are mounted on the cross bar 11, the wheels 23 then being held fixed in planes parallel to the draft line.

Having thus described the invention, what is claimed is:—

1. In a brake mechanism for vehicles, a frame, wheels journaled on the frame, means for driving the wheels, said means comprising a shaft journaled on the frame, brake drums on the shaft, straps cooperating with the drums, and mechanism for actuating the straps, said mechanism comprising a yoke mounted to swing on the frame, arms mounted to swing on the frame, means for connecting the arms with the straps, a member slidable in the yoke to engage both arms or to engage either arm to the exclusion of the other, and a shaft mounted to rock in the yoke and having means for actuating said member.

2. In a device of the class described, a frame, wheels journaled on the frame, means for driving the wheels, said means comprising a shaft journaled on the frame, a brake cooperating with the shaft, and mechanism for actuating the brake, said mechanism comprising a yoke mounted to swing with respect to the frame, an arm mounted to swing with respect to the frame, means for connecting the arm with the brake, a member slidable in the yoke into and out of engagement with the arm, and a shaft mounted to rock in the yoke and forming a handle whereby the yoke may actuate the arm and the brake, the last-specified shaft being provided with means for moving said member into and out of operative relation to the arm.

3. In a device of the class described, a frame, wheels journaled on the frame, means for driving the wheels, said means comprising a shaft journaled on the frame, a brake cooperating with the shaft, a segment supported by the frame, and mechanism for actuating the brake, said mechanism comprising a yoke mounted to swing with respect to the segment, an arm mounted to swing with respect to the segment, means for connecting the arm with the brake, a member slidable in the yoke into and out of engagement with the arm, and a shaft mounted to rock in the yoke and forming a handle whereby the yoke may be swung to actuate the arm and the brake, the last-specified shaft being provided with means for moving said member into and out of operative relation to the arm; and a latch mechanism carried by the yoke and cooperating with the segment.

In testimony that we claim the foregoing as our own, we have hereto affixed our signatures.

BURR S. HOWELL.
GEORGE M. FAST.